United States Patent
Klieber

(10) Patent No.: US 12,403,977 B2
(45) Date of Patent: Sep. 2, 2025

(54) APPARATUS FOR PROVIDING A RESTORING MOMENT FOR A TWO-WHEELER STEERING MECHANISM

(71) Applicant: Jochen Klieber, Tacherting (DE)

(72) Inventor: Jochen Klieber, Tacherting (DE)

( * ) Notice: Subject to any disclaimer, the term of this patent is extended or adjusted under 35 U.S.C. 154(b) by 394 days.

(21) Appl. No.: 17/836,363

(22) Filed: Jun. 9, 2022

(65) Prior Publication Data

US 2022/0396331 A1 Dec. 15, 2022

(30) Foreign Application Priority Data

Jun. 10, 2021 (DE) .................... 10 2021 005 463.6
Jun. 10, 2021 (DE) .................... 10 2021 115 055.8
Jul. 23, 2021 (DE) .................... 10 2021 119 189.0

(51) Int. Cl.
B62K 21/10 (2006.01)

(52) U.S. Cl.
CPC .................................. B62K 21/10 (2013.01)

(58) Field of Classification Search
CPC .................................................... B62K 21/10
See application file for complete search history.

(56) References Cited

U.S. PATENT DOCUMENTS

| | | | |
|---|---|---|---|
| 410,335 A | 9/1889 | Sanborn | |
| 1,230,801 A * | 6/1917 | Schriver | B62K 21/10 280/271 |
| 4,006,915 A * | 2/1977 | Parker | B62K 21/10 280/271 |
| 10,065,695 B1 * | 9/2018 | Melcher | B62K 21/10 |
| 2005/0236791 A1 * | 10/2005 | Carr | B62K 5/027 280/92 |
| 2014/0084563 A1 * | 3/2014 | Ehrhard | B62K 21/00 280/270 |
| 2017/0096183 A1 * | 4/2017 | Bales | B62K 21/10 |
| 2018/0093736 A1 * | 4/2018 | Marchetta | B62K 21/00 |

(Continued)

FOREIGN PATENT DOCUMENTS

| | | |
|---|---|---|
| CH | 142324 A | 9/1930 |
| CN | 109843710 A | 6/2019 |
| CN | 210149480 U | 3/2020 |

(Continued)

*Primary Examiner* — Brian L Swenson
(74) *Attorney, Agent, or Firm* — DINSMORE & SHOHL LLP

(57) ABSTRACT

An apparatus provides a restoring moment for a two-wheeler steering mechanism. A mounting device mounts the apparatus on a two-wheeler frame. A coupling device couples the apparatus with a fork shaft, and has a rotational axis. An energy storing device stores a restoring force. A force transmitting device transmits steering force to the energy storing device. The force transmitting device has a force transmitting point that is eccentric to the rotational axis, and forms a force action line through the eccentric force transmitting point and an application point of the force transmitting device on the energy storing device for transmitting the steering force to the energy storing device. In a neutral position of the apparatus, the force action line and a straight line running through the rotational axis and the application point enclose an angle. A two-wheeler frame, a two-wheeler steering and a two-wheeled vehicle are also provided.

42 Claims, 13 Drawing Sheets

(56) References Cited

U.S. PATENT DOCUMENTS

2020/0010141 A1    1/2020   Wilson

FOREIGN PATENT DOCUMENTS

| DE | 9213969 U1 | 10/1992 |
|----|------------|---------|
| DE | 3133098 A | 12/1992 |
| EP | 3192730 A1 | 7/2017 |
| EP | 3395660 A1 | 10/2018 |
| GB | 2573555 A | 11/2019 |
| JP | S3213415 | 10/1957 |
| JP | S33-12223 Y | 8/1958 |
| JP | H09301253 A | 11/1997 |
| JP | 2018-511526 A | 4/2018 |
| KR | 20160045285 A | 4/2016 |

* cited by examiner

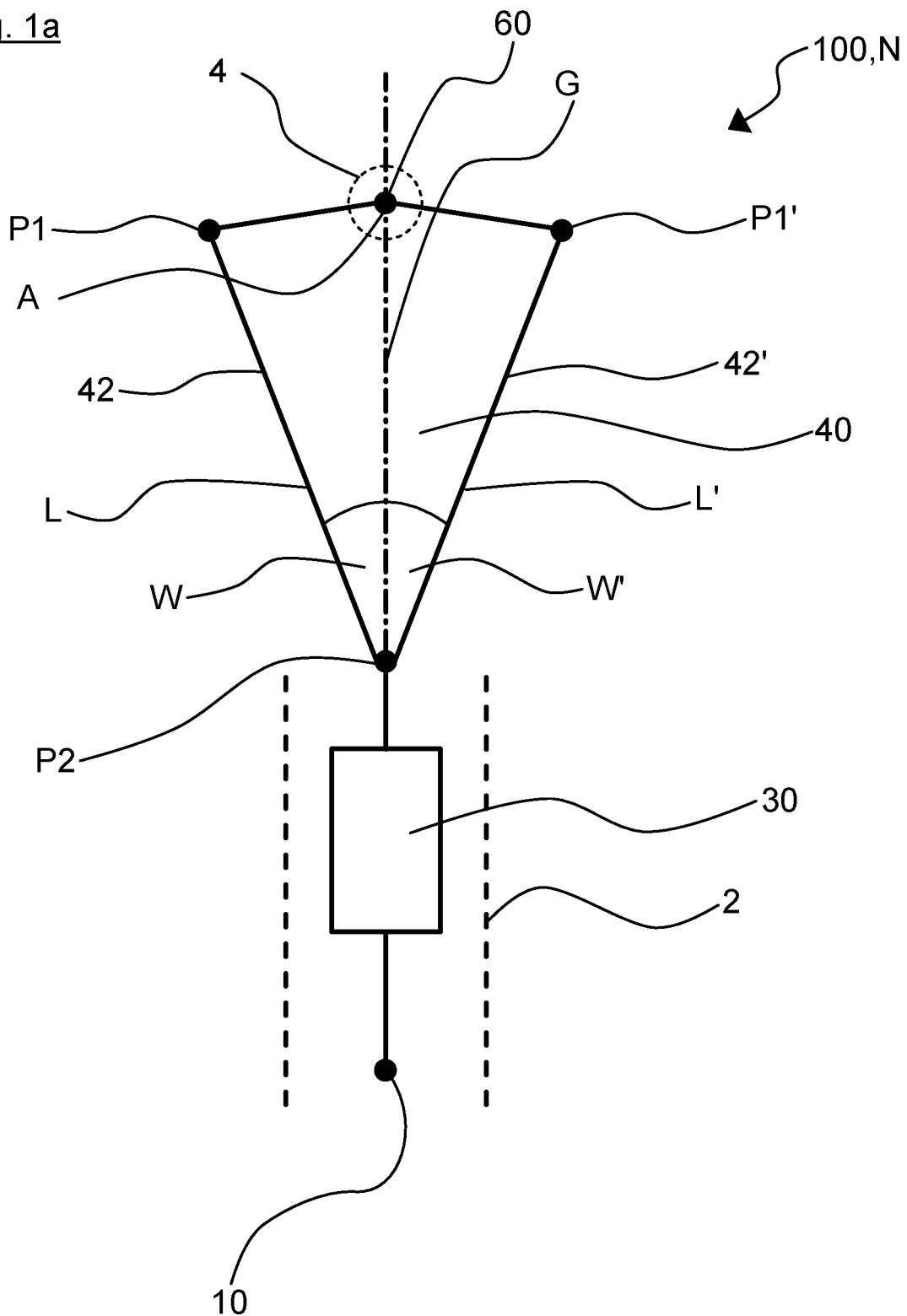

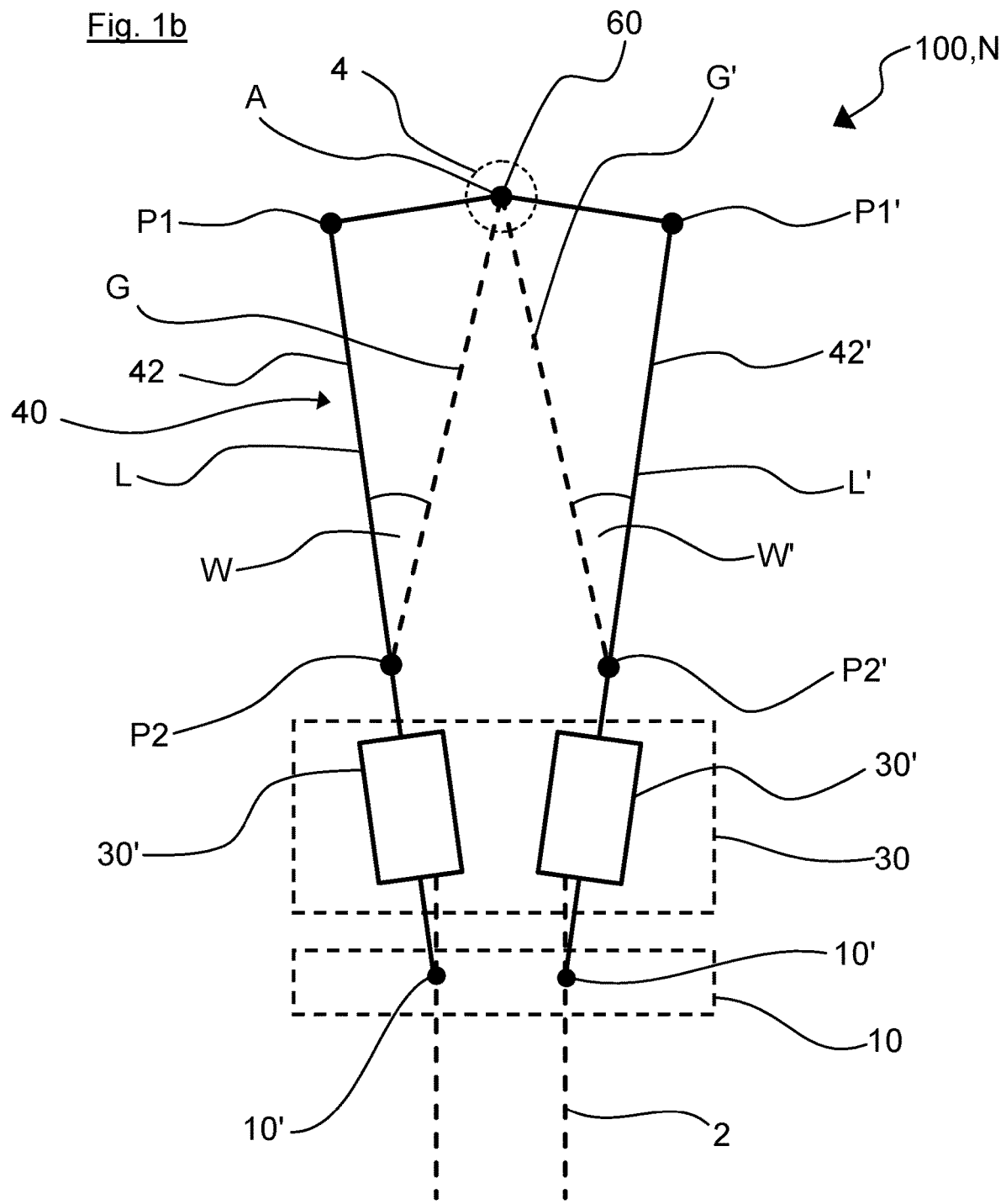

APPARATUS FOR PROVIDING A RESTORING MOMENT FOR A TWO-WHEELER STEERING MECHANISM

CROSS-REFERENCE TO RELATED APPLICATIONS

This application claims priority to German Patent Application No. 10 2021 115 055.8 filed Jun. 10, 2021, German Patent Application No. 10 2021 005 463.6 filed Jun. 10, 2021 and German Patent Application No. 10 2021 119 189.0 filed Jul. 23, 2021, which are incorporated herein by reference in its entirety.

FIELD OF THE INVENTION

The present invention relates to an apparatus for providing a restoring moment for a two-wheeler steering mechanism of a two-wheeled vehicle. The present invention also relates to a two-wheeler frame, a two-wheeler steering, and a two-wheeled vehicle.

BACKGROUND OF THE INVENTION

The running behavior of a two-wheeled vehicle may be unstable at low driving speeds. If the running stability is low, the front wheel of the two-wheeled vehicle may tend to tilt to the side. A tilting front wheel and a handlebar that swings to the side as a result may lead to dangerous riding situations.

Also when the front wheel of the two-wheeled vehicle is raised, the front wheel may tilt to the side and the handlebar may swing out to the side. For example, parking or lifting the two-wheeled vehicle or transporting the two-wheeled vehicle may be impaired in this way or result in damage to the area around the two-wheeled vehicle.

SUMMARY OF THE INVENTION

In one aspect, the present invention relates to an apparatus for providing a restoring moment for a two-wheeler steering mechanism. The apparatus may be configured to provide the restoring moment depending on a steering angle. The two-wheeler steering mechanism may be a bicycle steering mechanism or a motorcycle steering mechanism.

The restoring moment may be a restoring moment for restoring a fork shaft or a two-wheeler handlebar arranged thereon, which may be a bicycle handlebar or a motorcycle handlebar. Therefore, the restoring moment may be a fork shaft restoring moment or a handlebar restoring moment or may cause the fork shaft restoring moment or the handlebar restoring moment. The steering angle may be based on a turning angle of a two-wheeler handlebar of the two-wheeler steering mechanism. The apparatus may be a two-wheeler component that may be retrofittable to a two-wheeled vehicle. The apparatus may be mountable to a two-wheeler frame of the two-wheeled vehicle and may be couplable to a fork shaft of the two-wheeled vehicle. The two-wheeler component may be a bicycle component and/or a motorcycle component.

The restoring moment may cause the two-wheeler steering mechanism to return to a neutral position of the apparatus. The neutral position may be a state of the apparatus that may cause the two-wheeled vehicle to move straight ahead. The neutral position may also be a state of the apparatus in which the apparatus may be in a moment equilibrium or in a force equilibrium without an external steering force action.

The apparatus may have a mounting device for mounting the apparatus on a two-wheeler frame. The mounting device may be attachable to the two-wheeler frame. The mounting device may be configured for fixed mounting of the apparatus to the two-wheeler frame. Alternatively, the mounting device may be configured for movably mounting the apparatus to the two-wheeler frame, for example for pivotally mounting the apparatus to the two-wheeler frame. For example, the mounting device may have a mounting pin via which the apparatus may be rotatably mountable to the two-wheeler frame.

The apparatus may have a coupling device for coupling the apparatus to a fork shaft in a rotationally fixed manner. The coupling device may be configured for force-locking and/or form-locking coupling of the apparatus to the fork shaft. For example, the coupling device may be a round clamp or a clip which may be fixed to the fork shaft in a rotationally fixed manner. The steering angle may therefore correspond to a rotation angle of the fork shaft. The two-wheeler handlebar may be connected to the fork shaft in a rotationally fixed manner via a handlebar stem. The steering angle may therefore also correspond to a turning angle of the two-wheeler handlebar.

The coupling device may have a rotational axis, which may correspond to a rotational axis of the fork shaft. The rotational axis may be a common rotational axis of the fork shaft and the coupling device. The fork shaft may be mounted rotatably around the rotational axis on a headset in a head tube of the two-wheeler frame.

According to an embodiment of the apparatus, the coupling device may be a front wheel fork. The apparatus may thus be coupled to the fork shaft via the front wheel fork. The coupling device may, for example, be a fork arm of the front wheel fork. The apparatus may thus also be coupled to the fork shaft via the fork arm. The apparatus may thus be retrofitted to a front wheel in a particularly compact manner.

The apparatus may have an energy storing device for storing a restoring force. The restoring force may be a restoring force for restoring the fork shaft or the two-wheeler handlebar arranged on the fork shaft. Therefore, the restoring force may be a fork shaft restoring force or a handlebar restoring force or may cause the fork shaft restoring force or the handlebar restoring force. The energy storing device may be configured to provide or output a restoring force that builds up when the coupling device rotates. The rotation of the coupling device may be based on a rotation of the fork shaft or a turning of the two-wheeler handlebar.

The apparatus may have a force transmitting device for transmitting a steering force to the energy storing device. The force transmitting device may also be configured to transmit the restoring force to the coupling device. The energy storing device may be configured to introduce the stored restoring force to the force transmitting device.

The force transmitting device may have a force transmitting point being eccentric to the rotational axis. The force transmitting point may form a force application point of a force lever for transmitting the steering force to the energy storing device or for providing the restoring moment. The force lever may be formed as a one-sided force lever between the rotational axis and the force transmitting point or may act as such.

The force transmitting device may form a force action line through the eccentric force transmitting point and an application point of the force transmitting device on the energy storing device for transmitting the steering force to the energy storing device. The force action line may be configured to transmit a traction force that is based on the steering force. The force action line may also be configured to transmit the restoring force from the energy storing device to the coupling device.

According to a further embodiment of the apparatus, the force transmitting point and/or the application point may be arrangeable or may be arranged on a longitudinal frame axis or in a frame middle. Alternatively, the force transmitting point and/or the application point may be arranged or may be arrangeable offset from the longitudinal frame axis or offset from the frame middle.

In a neutral position of the apparatus, the force action line and a straight line running through the rotational axis and the application point may enclose an angle. The force action line may intersect the straight line with the enclosed angle. The angle is an angle that is not 180°. In particular, the angle is an acute angle. The force action line may be a line of force acting when a steering angle sets from the neutral position.

With the apparatus according to the invention, an immediate response of the energy storing device may be created in an advantageous manner when building up a restoring moment when a steering angle sets from the neutral position into a predetermined steering angle range. With the force transmitting point, that is distanced from the straight line through the rotational axis and the application point, and the resulting force action line resulting thereof that is obliquely formed to the straight line, an effective connection for transmitting the steering force to the energy storing device may be held directly. An initial dead zone in the force transmission when the steering angle sets from the neutral position into the predetermined steering angle range may therefore be reduced or eliminated with the apparatus.

With the invention, an improved running behavior of a two-wheeled vehicle may be achieved as an advantageous effect. In particular, the driving behavior of the two-wheeled vehicle may be more stable with the invention. Furthermore, improved handling of a bicycle may also be achieved with the invention. In particular, a deflection of a raised front wheel may be prevented.

A further particularly advantageous effect of the invention is that a greater scope for designing the steering geometry parameters of a two-wheeled vehicle is obtained through the improved driving behaviour and the increased running stability of the two-wheeled vehicle with the apparatus according to the invention. The steering geometry parameters of a two-wheeled vehicle may thus be changed over a wider range of parameters by the invention, without thereby jeopardizing the running stability of the two-wheeled vehicle. For example, the invention thus provides a greater scope for adjustments or changes to the steering head angle, the front wheel diameter, the fork bend or the caster of a front-wheel steering.

According to a further embodiment of the apparatus, the force transmitting device may have two force transmitting elements for transmitting the steering force to the energy storing device. According to this embodiment, the force transmitting elements may each have a force transmitting point being eccentric to the rotational axis. According to this embodiment, a force action line may be formed through an eccentric force transmitting point and the application point for transmitting the steering force to the energy storing device when steering to the right. The force transmitting device may have a further application point at the energy storing device for transmitting the steering force to the energy storing device. The further application point may be formed on the energy storing device spaced apart from the application point. A further force action line may be formed through the further eccentric force transmitting point and the application point or the further application point for transmitting the steering force to the energy storing device when steering to the left. In the neutral position of the apparatus, the further force action line may enclose a further angle through the further eccentric force transmitting point and a further straight line passing through the rotational axis and the further application point. The further angle may be formed like the described angle.

The force action lines may enclose an angle at the application point which corresponds to twice the angle between the force action line and the straight line through the rotational axis and the application point. In the neutral position, the force transmitting elements may be arranged axis-symmetrically to a straight line through the application point and the rotational axis. The force transmission points may further be arranged equidistant from the rotational axis in the neutral position. The apparatus may thus symmetrically provide a respective restoring moment for steering to the right and left.

According to a further embodiment of the apparatus, the apparatus may be configured to transmit energy to the energy storing device in the neutral position by which a stabilizing force for stabilizing the fork shaft is transmittable to the coupling device via the force transmitting device in the neutral position. The energy transmitted to the energy storing device may be transmitted from the mounting device and/or from the force transmitting device to the energy storing device. The stabilizing force may be a tensile force acting in the apparatus, and the force transmitting device may be in tension in the neutral position. The stabilizing force may counteract deflection of the steering mechanism. Thus, already in the neutral position, the apparatus may increase the running stability and handleability of a two-wheeled vehicle.

According to a further embodiment of the apparatus, the apparatus may have a compensating mechanism being configured to compensate a tensile stress acting on the force transmitting device when a steering angle sets from the neutral position in a predetermined steering angle range. The compensating mechanism may convert the tensile stress into another form of a stress of the energy storing device, for example a bending stress or a torsional stress. The restoring moment may therefore form when the steering angle sets from the neutral position to the predetermined steering angle range depending on the further form of the stress. The compensating mechanism may be configured such that a buildup of the restoring moment, in particular a progressive buildup of the restoring moment, may be set without a jerk when steering from the neutral position.

According to a further embodiment of the apparatus, the force transmitting device may be configured to provide a progressive buildup of the restoring moment when a steering angle sets from the neutral position in a predetermined steering angle range. The progressive buildup may change to a proportional or degressive buildup of the restoring moment in a further steering angle range adjacent to the predetermined steering angle range. The progressive buildup may improve the immediate response of the energy storing device to the restoring moment building up from the neutral position in a predetermined steering angle range.

According to a further embodiment of the apparatus, the force transmitting device may be configured to provide a degressive buildup of the restoring moment when a steering angle sets in a predetermined steering angle range. According to a further embodiment of the apparatus, the steering angle that sets from the neutral position in the predetermined steering angle range for providing the progressive buildup of the restoring moment may be smaller than the steering angle that sets in the predetermined steering angle range for providing the degressive buildup of the restoring moment. The predetermined steering angle ranges may be adjacent to each other or have an angular separation from each other.

Still according to a further embodiment of the apparatus, the force transmitting device may be configured to provide a proportional buildup of the restoring moment when the steering angle sets in a predetermined steering angle range. The force transmitting device may be configured such that the degressive buildup of the restoring moment may set from the proportional buildup of the restoring moment, which may combine the progressive buildup of the restoring moment and the degressive buildup of the restoring moment. The progressive buildup of the restoring moment or the degressive buildup of the restoring moment may be brought about by a variable force transmission in the force transmitting device, wherein the variable force transmission may be formed in the respective predetermined steering angle range. In particular due to the degressive buildup, the response of the energy storing device may be maintained even at large steering angles.

According to a further embodiment of the apparatus, the energy storing device may elastically couple the mounting device and the coupling device. The energy storing device may comprise at least one elastic energy storing element. The energy storing element may for example be a spring. The energy storing elements of the energy storing device may therefore be non-elastic, in particular tensile-stiff. Alternatively or in addition to the elastic energy storing element, the force transmitting elements may also be at least partially elastic. According to a further embodiment, the force transmitting device may have a further or additional energy storing element. An elastically deformable energy storing device may advantageously provide an elastic return to provide the restoring moment and a change in length that adjusts during steering in the apparatus.

According to a further embodiment, the energy storing device may have two energy storing elements for storing a restoring force. At least one of the two energy storing elements may be formed like the elastic energy storing element. One of the two energy storing elements may be formed to store a restoring force when steering to the right, and the other one of the two energy storage elements may be formed to store a restoring force when steering to the left. One of the two energy storing elements may be configured to provide or output a restoring force that builds up when the coupling device is rotated during steering to the right. The other one of the two energy storing elements may therefore be configured to store the restoring force when steering to the right. The force action line may be formed by the eccentric force transmitting point and the application point for transmitting the steering force to the energy storing element when steering to the right. The further of the two energy storing elements may be configured to provide or output a restoring force that builds up when the coupling device is turned when steering to the left. The further energy storing element may therefore be configured to store the restoring force when steering to the left. Advantageously, the two energy storing elements may be retrofitted to a two-wheeler frame in an exposed manner. The further force action line may be formed by the further eccentric force transmitting point and the further application point for transmitting the steering force to the further energy storing element when steering to the left.

According to a further embodiment, the mounting device may have two mounting elements for mounting the apparatus on the two-wheeler frame. The energy storing element may be mountable or mounted on the two-wheeler frame via one of the two mounting elements. The further energy storing element may be mountable or mounted on the two-wheeler frame via the further of the two mounting elements. The mounting elements may be attachable to or attached on the two-wheeler frame, for example a frame tube, spaced apart from one another. The mounting elements may be attached to or attachable on the frame tube in an exposed manner or from the outside, for example mounted or mountable in recesses of the frame tube.

According to a further embodiment of the apparatus, the energy storing device may have at least one spring for storing a tension energy. At least one of the two energy storing elements may have the spring. For example, the energy storing device may have a pair of springs. According to a further embodiment of the apparatus, the spring may be formed as a traction spring. According to still another embodiment of the apparatus, the spring may be formed as a compression spring. The at least one spring may be or comprise a coil spring. Alternatively or additionally, the at least one spring may be or comprise an elastomeric spring. The tension energy stored in the spring may provide or cause the restoring force.

According to a further embodiment of the apparatus, the apparatus may be configured to apply a pretension to the spring in the neutral position by which a stabilizing force for stabilizing the fork shaft is transmittable in the neutral position via the force transmitting device to the coupling device. The mounting device and/or the force transmitting device may be configured to apply the pretension to the spring. The pretension of the spring may further improve the progressive buildup of the restoring moment.

According to a further embodiment of the apparatus, the spring may be configured such that it is bending stressed when a steering angle sets from the neutral position in a predetermined steering angle range. The spring may therefore be part of the compensating mechanism for compensating the traction force. A bending stress of the spring when the steering angle sets from the neutral position in a predetermined steering angle range may merge into a traction stress of the spring in a steering angle range adjacent to the predetermined steering angle range or be superimposed on a traction stress. The bending stress may be brought about by the traction elements, which may act on the spring when the steering angle sets from the neutral position into a predetermined steering angle range in such a way that the traction elements may jointly introduce a traction force on the spring and thus bring about the bending stress.

According to a further embodiment of the apparatus, the force transmitting device may have a traction mechanism linking the coupling device and the energy storing device for transmitting a traction force that is based on the steering force to the energy storing device. The traction mechanism may be attached to the coupling device and to the energy storing device in a tension-proof manner.

According to a further embodiment of the apparatus, the traction mechanism may have two traction elements for transmitting the steering force to the energy storing device. The force transmitting elements may comprise the traction elements or be formed as such. According to this embodiment, one force action line may be formed by a traction element for transmitting the steering force to the energy storing device when steering to the right. A further force action line may be formed by the further traction element for transmitting the steering force to the energy storing device when steering to the left. A traction force may be introduced into the energy storing device along the respective force action line. A traction force resulting from the steering force due to the eccentric force transmission points may thus be introduced into the energy storing device when steering to the right and left and cause a respective restoring force.

According to a further embodiment of the apparatus, the traction mechanism may be configured such that both traction elements are tensile stressed when a steering angle sets from the neutral position in a predetermined steering angle range. Such tensile stress may result from the energy transmitted to the energy storing device in the neutral position. For example, the tensile stress may result from the pretension that may be applied to the spring.

According to a further embodiment of the apparatus, the traction elements may be arranged spaced apart from each other on the energy storing device. Such a spaced arrangement may be a component of the compensating mechanism. Further, the bending stress of the spring may be based on the spaced arrangement. According to a further embodiment of the apparatus, the traction mechanism may connect the coupling device and the energy storing device via a 4-point connection, in particular a trapezoid connection. According to one embodiment, the coupling device and the energy storing elements may be connected via a 4-point connection, in particular a trapezoid connection. The shorter base line of the trapezoid connection may be arranged at the energy storing device or at the energy storing elements, and the longer base line of the trapezoid connection may be arranged at the coupling device. According to a further embodiment of the apparatus, the legs of the trapezoid connection may be formed by traction elements for transmitting the steering force to the energy storing device or to the energy storing elements. The traction elements may be configured to introduce a traction force based on the steering force into the energy storing device or into the energy storing elements. The traction elements may have at least one traction strap that may connect the coupling device with the energy storing device or with the energy storing elements in a tension-proof manner via or at the force transmission point.

Alternatively or in addition to the traction strap, the traction elements may have at least one traction rod which may connect the coupling device to the energy storing device in a tension-proof manner via the force transmitting point or at the force transmitting point. Thus, in particular both traction elements may also be formed by traction straps or traction rods. The traction elements may be formed at least in some areas as tensile-stiff traction elements. Alternatively or additionally, the traction elements may be formed at least in some areas as elastic traction elements, for example as traction springs. A traction element may be movably mounted or guided at the force transmitting point or at the coupling device. In this way, traction forces resulting from the steering force in the apparatus may be efficiently introduced into the energy storing device.

According to a further embodiment of the apparatus, at least one of the traction elements may be formed by a strap being connected with the coupling device. The strap may be the described traction strap or vice versa. Both traction elements may be formed by a strap, wherein the strap may be formed by continuous strap sections. The strap may connect the coupling device and the energy storing device in such a way that the strap may be subjected to tensile stress when steering to the right and when steering to the left. The strap may be formed as a tensile-stiff and/or elastic strap, at least in some areas.

According to a further embodiment of the apparatus, the strap may be formed as a limp strap. The strap may be deformable radially to the rotational axis and may be fastened to the coupling device at a fastening point spaced apart from the force transmitting point. The force transmitting point may thus also be a force transmission point at which the force transmitting element, the traction element or the strap may be arranged. The strap may be spread or stretched radially with respect to the rotational axis at the force transmitting point. The strap may therefore form a traction element that may be variably aligned for force transmission and at the same time be a tensile-proof traction element.

According to another embodiment of the apparatus, the strap may have a plastic-made strap, in particular a strap made of aramid fibers. The weight of the apparatus, which may be formed as a two-wheeler component, may thus be efficiently reduced while maintaining the tensile strength.

According to a further embodiment of the apparatus, the force transmitting device may have a force transmission element arranged on the coupling device, at which the force transmitting point is formed. The force transmission element may form the force lever. The force transmission element may have a contour formed radially to the rotational axis or follow such a contour, whereby the force transmitting point may move on the contour as the steering angle adjusts or may adjust variably.

According to a further embodiment, the force transmission element may be arranged on the front wheel fork. The front wheel fork may have or form the force transmission element. The front wheel fork and the force transmission element may be formed integrally. The force transmission element may also be integrated into the front wheel fork.

According to a further embodiment of the apparatus, the force transmission element may be configured to variably set a force transmission for transmitting the steering force to the energy storing device when a steering angle sets in a predetermined steering angle range. According to a further embodiment of the apparatus, the force transmission element may be configured to provide a force transmission for a degressive buildup of the restoring moment when a steering angle sets in a predetermined steering angle range. The predetermined steering angle range may thus be in particular the steering angle range at which the progressive buildup of the restoring moment may be provided from the neutral position.

As an alternative or in addition to the force transmission configured for a degressive buildup of the restoring moment, the force transmission element may be configured to provide a force transmission for a progressive buildup of the restoring moment when a steering angle sets in a predetermined steering angle range. The predetermined steering angle range may in particular also be the steering angle range at which the degressive buildup of the restoring moment is provided. The force transmission element may be configured with the contour to provide the force transmission accordingly.

According to a further embodiment of the apparatus, the force transmission element may be or comprise a cam. The apparatus may have two force transmission elements, on each of which one of the described force transmitting points may be arranged. The apparatus may therefore also have a double cam. The described contour may be formed on the cam.

According to a further embodiment of the apparatus, the coupling device may be formed integrally with the force transmission element. The coupling device may therefore have or form the cam or the double cam. The installation space of the apparatus may thus be reduced in such a way that the coupling device may be installed on a two-wheeler frame in a space-saving manner.

According to a further embodiment of the apparatus, the mounting device may have an actuation mechanism for transmitting energy in the neutral position to the energy storing device. The actuation mechanism may be configured to induce a force, for example a traction force, to the energy storing device. The energy storing device may therefore be configured to transfer energy or a force, for example the stabilizing force, to the force transmitting device in the neutral position. According to a further embodiment of the apparatus, the actuation mechanism may be configured to transmit tension energy to the spring in the neutral position. The actuation mechanism may be configured to apply a force, such as a traction force, to the spring. The spring may therefore be configured to transmit energy or a force, for example the stabilizing force, to the force transmitting apparatus in the neutral position.

According to a further embodiment of the apparatus, the actuation mechanism may have a rotationally actuatable excentre which may be operatively connected to the energy storing device for transforming a rotational movement of the excentre into energy being transmittable to the energy storing device. The excentre may have a mounting element with which the excentre may be mounted on the two-wheeler frame. The mounting device may have an eccentrically mounted cylinder which forms the excentre. The energy storing device may have a receptacle in which the excentre or the cylinder may be rotatably mounted. The rotational movement of the excentre may thus be converted into a translational movement of the receptacle, which may transmit the described force to the energy storing device. The receptacle may be a cylindrical receptacle. With the excentre, the actuation mechanism for transmitting energy to the energy storing device in the neutral position may be arranged in a frame component of a two-wheeler frame in a particularly space-saving manner.

According to a further embodiment of the apparatus, the actuation mechanism may comprise a translationally actuatable actuation element which is operatively connected to the energy storing device for converting a translational movement of the actuation element into energy transmittable to the energy storing device. The actuation element may have a guide element with which the actuation element may be guidable linearly on the two-wheeler frame. The actuation element may be a pushing element that is tensile-stiff connected to the energy storing device to transmit a pushing force exerted on the pushing element to the energy storing device. The sliding element may be connected to the spring in a tensile-stiff manner in order to transmit a tension force to the spring. The sliding element may be configured to be manually operable. For example, the sliding element may be actuated by an elongated hole arranged in a frame component. The sliding element, which may be integrated in the frame component, may be used to avoid parts exposed on the frame component.

According to a further embodiment of the apparatus, the actuation mechanism may have an actuation element, in particular an actuation lever, which is rotationally fixed to the excentre and with which the rotational movement of the excentre may be induced tool-free. The actuation element may be configured to be manually operable. The actuation element may also form the mounting device for mounting the actuation mechanism on the two-wheeler frame. The actuation element may be connected rotationally-proof to the excentre and transmit a rotational movement thereto. According to a further embodiment of the apparatus, the mounting device may comprise a guide, in particular a curved guide groove, for guiding a rotational movement of the excentre. The guide may be formed on the mount or on the excentre.

According to a further embodiment of the apparatus, the mounting device may have at least one stop body for setting a predefined rotational position of the excentre in which the actuation mechanism causes in the neutral position a predefined energy level being stored in the energy storing device. Thus, a predefined energy level may already be provided in the neutral position, in particular to provide the stabilizing force. The progressive buildup and immediate response of the energy storing device to the restoring moment building up from the neutral position in a predetermined steering angle range may thus be further improved. According to a further embodiment of the apparatus, the guide may have the stop body. The mounting device may thus have a particularly compact structure.

In another aspect, the present invention relates to a two-wheeler frame e, on which the apparatus according to the preceding aspect is mounted linkable with a fork shaft. The two-wheeler frame may be a bicycle frame or a motorcycle frame. The apparatus may be mounted to at least one frame tube of the two-wheeler frame, for example, a frame top tube and/or a frame bottom tube of the frame.

According to one embodiment of the two-wheeler frame, the apparatus may be arranged in at least one frame component of the two-wheeler frame in an integrated manner. The energy storing device or the energy storing elements may be arranged in the two-wheeler frame in an integrated manner. Alternatively, the energy storing device or the energy storing elements may be arranged outside the frame. The apparatus may be arranged at least partially in at least one frame tube of the two-wheeler frame, for example in a frame top tube and/or in a frame bottom tube of the two-wheeler frame. The energy storing device and/or the energy storing elements may be arranged at least partially in the at least one frame tube of the two-wheeler frame in an integrated manner, for example in the frame top tube and/or in the frame bottom tube of the two-wheeler frame.

Alternatively, the energy storing device and/or the energy storing elements may be arranged outside the at least one frame tube of the two-wheeler frame, for example outside the frame top tube and/or outside the frame bottom tube of the frame. The apparatus may be mounted to the frame top tube and/or to the frame bottom tube. The apparatus may be arranged at least partially in a steering tube of the two-wheeler frame in an integrated manner. The apparatus may be arranged spaced apart from the steering tube or without contact with the steering tube.

In another aspect, the present invention relates to a two-wheeler steering. The two-wheeler steering may comprise the apparatus according to the respective preceding aspect. The two-wheeler steering may have a fork shaft to which the apparatus is coupled. The two-wheeler steering may be a bicycle steering or a motorcycle steering. According to another embodiment of the two-wheeler steering, the apparatus may be coupled to the fork shaft via a two-wheeler fork. For example, the steering may be coupled to the fork shaft via a fork arm of the two-wheeler fork.

In another aspect, the present invention relates to a two-wheeled vehicle. The two-wheeled vehicle may have a two-wheeler frame according to the respective preceding aspect and/or a two-wheeler steering according to the respective preceding aspect. The two-wheeled vehicle may be a bicycle, a scooter, a motor scooter, or a motorcycle.

In the present invention, embodiments and features of one of the aspects described may form corresponding embodiments and features of another of the aspects described.

BRIEF DESCRIPTION OF THE DRAWINGS

FIG. 1a is a schematic representation of an apparatus for providing a restoring moment in a schematic representation according to an embodiment for explaining the invention;

FIG. 1b is a schematic representation of the apparatus for providing a restoring moment in a schematic representation according to a further embodiment for explaining the invention;

DETAILED DESCRIPTION OF THE INVENTION

Figure 2:
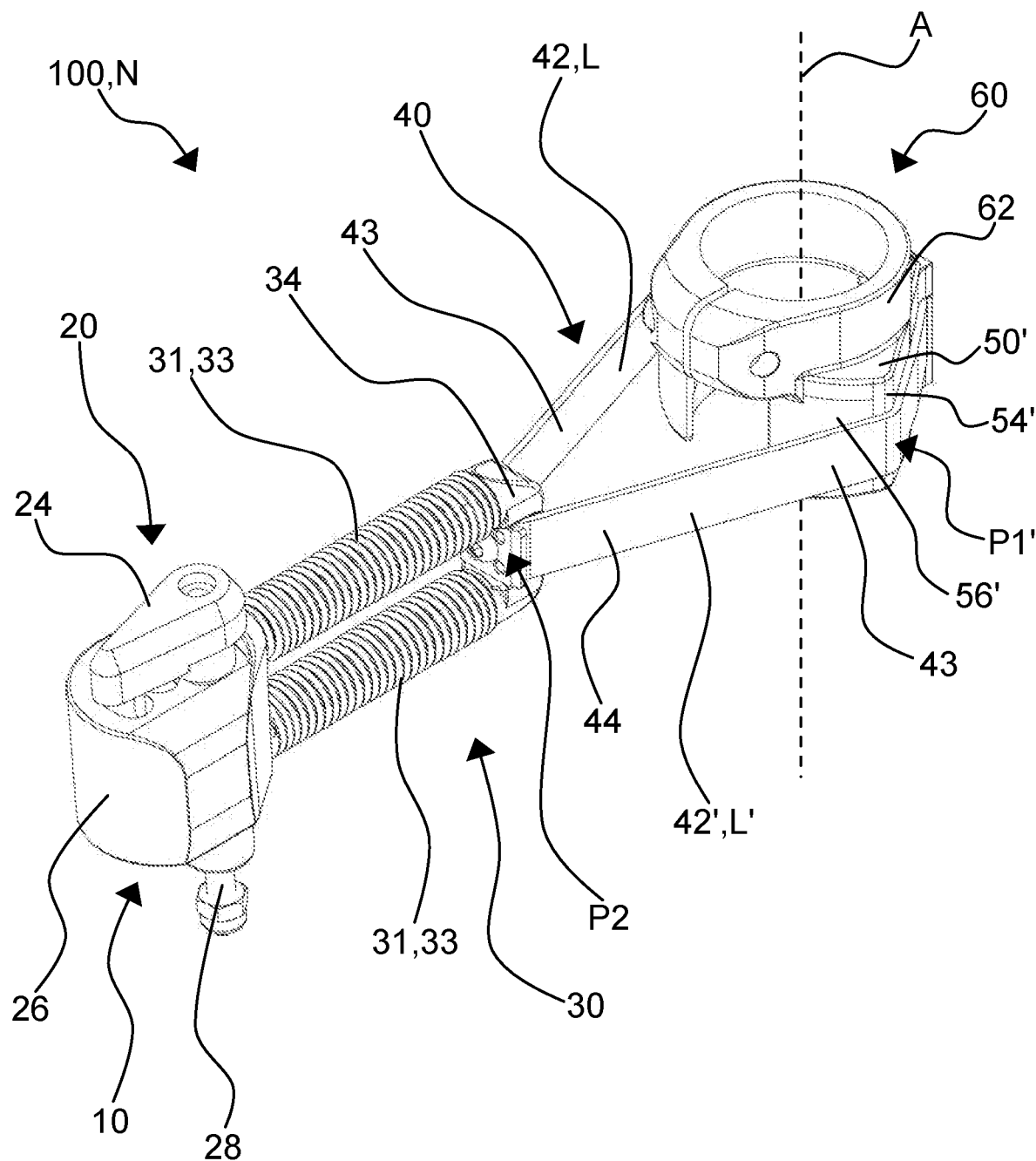
FIG. 2 is a drawing of an apparatus for providing a restoring moment in a perspective view according to one embodiment of the invention.

FIG. 1a schematically shows an apparatus 100 for providing a restoring moment for a two-wheeler steering mechanism not shown. The apparatus 100 is shown in the schematic representation in a top view. The apparatus 100 is shown in a neutral position N of the apparatus 100. The neutral position N shown may cause straight-ahead steering by the two-wheeler steering mechanism. In the neutral position N, the two-wheeler steering mechanism may be in a state that does not form a steering angle. The apparatus 100 does not provide a restoring moment in the shown neutral position N. The apparatus 100 may be in a force equilibrium in the neutral position N without an external steering force acting on the apparatus 100.

The apparatus 100 comprises a mounting device 10, which is mounted to a two-wheeler frame 2. The apparatus 100 further comprises a coupling device 60, which is coupled in a rotation-proof manner to a fork shaft 4 of the two-wheeler steering mechanism. The coupling device 60 has a rotational axis A, which may correspond to a rotational axis of the fork shaft 4. The apparatus 100 may thus be arranged or constrained between a mounting point of the mounting device 10 on the two-wheeler frame 2 and the rotational axis A of the coupling device 60.

The apparatus 100 has an energy storing device 30 for storing a restoring force that provides the restoring moment. The coupling device 60 is connected to the mounting device 10 via the energy storing device 30. The apparatus 100 further comprises a force transmitting device 40 configured to transmit a steering force applied to or resulting from the two-wheeler steering mechanism to the energy storing device 30.

The force transmitting device 40 has a force transmitting point P1 being eccentric to the rotational axis A, which is operatively connected to the coupling device 60 in order to transmit the steering force to the force transmitting point P1. The eccentric force transmitting point P1 and an application point P2 of the force transmitting device 40 on the energy storing device 30 form a force action line L through which the steering force may be transmitted to the energy storing device 30, in particular when steering to the right. The force transmitting point P1 and the force action line L are configured to transmit the steering force caused by the two-wheeler steering mechanism, in particular when steering to the right, acting on the steering two-wheeler mechanism to the energy storing device 30, which may provide a corresponding restoring force.

The force transmitting device 40 has a further force transmitting point P1' eccentric to the rotational axis A, which is operatively connected to the coupling device 60 in order to transmit the steering force to the force transmitting point P1'. The eccentric force transmitting point P1' and the application point P2 of the force transmitting device 40 on the energy storing device 30 form a further force action line L' through which the steering force is transmittable to the energy storing device 30, in particular when steering to the left. The further force transmitting point P1' and the further force action line L' are configured to in particular transmit the steering force acting on the two-wheeler steering mechanism for bringing about the steering to the energy storing device 30 when steering to the left is caused by the two-wheeler steering mechanism, which may provide a respective restoring force.

In the shown neutral position N of the apparatus 100, the force action line L and a straight line G, which runs through the rotational axis A and the application point P2, enclose an angle W, which is smaller than 180° and in the shown embodiment smaller than 90°, in particular smaller than 45° as an acute angle. The angle W is enclosed by the rotational axis A, the application point P2 and the force transmitting point P1 and is formed at the application point P2. The angle W may be an acute angle. Mirrored on the straight line G, the angle W may also be enclosed by the force transmitting point P1', the application point P2 and the rotational axis A and formed as angle W' at the application point P2. The force action lines L, L' may be arranged symmetrically to the straight line G. The effective connections between the rotational axis A and the force transmission points P1, P1' may also be arranged symmetrically to the straight line G. The force action lines L, L' and the effective connections may span a triangle or a trapezoid, whereby for the trapezoid two mutually spaced apart application points may apply on the energy storing device 30.

According to the embodiment of the apparatus 100 shown in FIG. 1b, the energy storing device 30 has two energy storing elements 30'. In addition, the apparatus 100 has two application points P2, P2' spaced apart from one another, via which the steering force acting on or resulting from the two-wheeler steering may be transmitted to the energy storing device 30 by the force transmitting device 40. In the shown neutral position N of the apparatus 100, the force action line L' and a further straight line G', which passes through the rotational axis A and the further application point P2', enclose the angle W'. One of the two energy storing elements 30' is configured to transmit the steering force to the energy storing device 30 when steering to the right. The other one of the two energy storing elements 30' is configured to transmit the steering force to the energy storing device 30 when steering to the left. According to this embodiment, the coupling device 60 may be a two-wheeler fork not shown in the figures. The energy storing elements 30' may have traction springs, which may be hooked in the two-wheeler fork.

According to the embodiment of the apparatus 100 shown in FIG. 1b, the mounting device 10 has two mounting elements 10'. The two mounting elements 10' are arranged exposed on the two-wheeler frame 2. The mounting elements 10' may be externally attached to a frame tube. The energy storing elements 30' may also have the mounting elements 10' mounted on the frame tube. If the energy storing elements 30' have the traction spring, they may be suspended from the frame tube.

Figure 3:
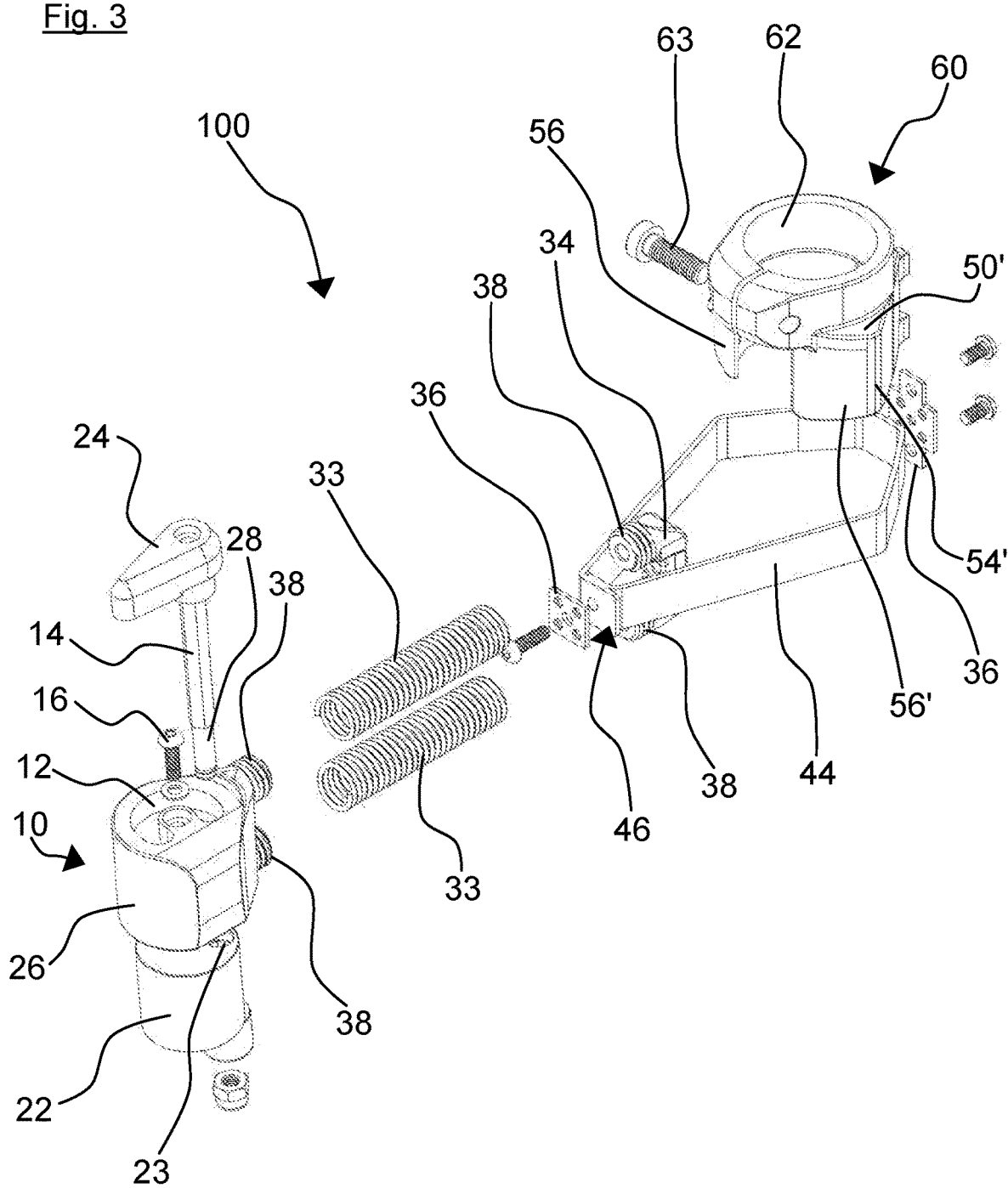
FIG. 3 is a drawing of the apparatus of FIG. 2 in an exploded view.

FIGS. 2 and 3 show the apparatus 100 in one embodiment. FIG. 2 shows the apparatus 100 in the neutral position N in a perspective view. FIG. 3 shows the apparatus 100 in an exploded view.

The coupling device 60 has a clamping ring 62 which may be clampable to the fork shaft 4 with a clamping screw 63. A force transmission element 50 is arranged on the coupling device 60, on which the force transmitting point P1 is formed. A further force transmission element 50' is arranged on the coupling device 60, on which the further force transmitting point P1' is formed. The force transmission elements 50, 50' may be arranged opposite to each other on the coupling device 60. Therefore, the force transmitting points P1, P1' may also be formed opposite to each other on the coupling device 60. The force transmission elements 50, 50' may be formed as respective cams 54, 54'. The force transmission elements 50, 50' may have cam surfaces 56, 56' facing the energy storing device 30. When the coupling device 60 is rotated about the rotational axis A, at least one of the force transmitting points P1, P1' may be formed on the cam surfaces 56, 56'.

The force transmitting device 40 has two force transmitting elements 42, 42', based on which the force action lines L, L' are formed. The force transmitting elements 42, 42' are formed as traction elements 43, 43', which introduce the steering force brought about by the two-wheeler steering mechanism when steering to the right or left in the energy storing device 30 as a traction force.

The force transmitting device 40 also has a traction strap 44 that forms the traction elements 43, 43'. The traction elements 43, 43' may be formed by strap sections of the strap 44. The traction strap 44 may be formed as a single piece and may extend around the force transmission elements 50, 50' at least in some areas. The traction strap 44 may be fastened to the coupling device 60, wherein the traction strap 44 may be fastened, for example screwed, to the coupling device 60 via a fastener, for example a fastener plate 36. The traction strap 44 may be connected to the coupling device 60 on a side facing away from the energy storing device 30.

The traction strap 44 may further be connected to the energy storing device 30. The energy storing device 30 may have two traction springs 33. The traction strap 44 may be fastened to a holder 34, which is connected to the energy storing device 30. The traction strap 44 may be fastened, for example screwed, to the holder 34 via a fastener, for example a fastener plate 36. If the traction strap 44 is formed integrally, the traction strap 44 may be screwed to the holder 34 at a strap overlap region 46.

The holder 34 may have two threads 38, onto which the traction springs 33, formed as coil springs, may be screwed. The traction elements 43, 43' may engage the traction springs 33 at spaced intervals, wherein the traction strap 44 may be spread trapezoidal between the energy storing device 30 and the force transmitting elements 42, 42'.

The mounting device 10 may have an excentre 22 arranged in a cylindrical receptacle 26, which may be centrally mounted in the receptacle 26 via a centering 16, for example a centric screw connection. The mounting device 10 may further comprise an actuation mechanism 20, by means of which the excentre 22 may be rotated eccentrically with respect to the centering 16. For this purpose, the mounting device 10 may have an actuating lever 24 which may engage, via an engagement area 14 in the excentre 22, in an excentre engagement 23 formed eccentrically to the centering 16 in the excentre 22. The excentre 22 may be rotated via the actuating lever 24 via a form-fitted engagement of the engagement area 14 in the excentre engagement 23. The actuating lever 24 may include a mounting pin 28, which is mountable on a two-wheeler frame 2. Rotation of the excentre 22 may move the receptacle 26 relative to the two-wheeler frame 2. During rotation of the excentre 22, the engagement area 14 may be moved or guided along a guide groove 12, which may be arranged in the receptacle 26.

The energy storing device 30 may be fastened to the receptacle 26. If the energy storing device 30 has the traction spring 33, the relative movement of the receptacle 26 relative to the frame 2 of a two-wheeled vehicle may transmit a pretension to the traction springs 33. The traction springs 33 may be secured by threads 38 disposed on the receptacle 26. The movement of the receptacle 26 may be guided by a guide 12, which accommodates the engagement area 14 of the actuating lever 24. Thus, in the neutral position N, energy may already be transmitted to the energy storing device 30 or a tensile stress may be generated on the traction springs 33 to transmit a stabilizing force to the steering shaft 4.

Figure 4:
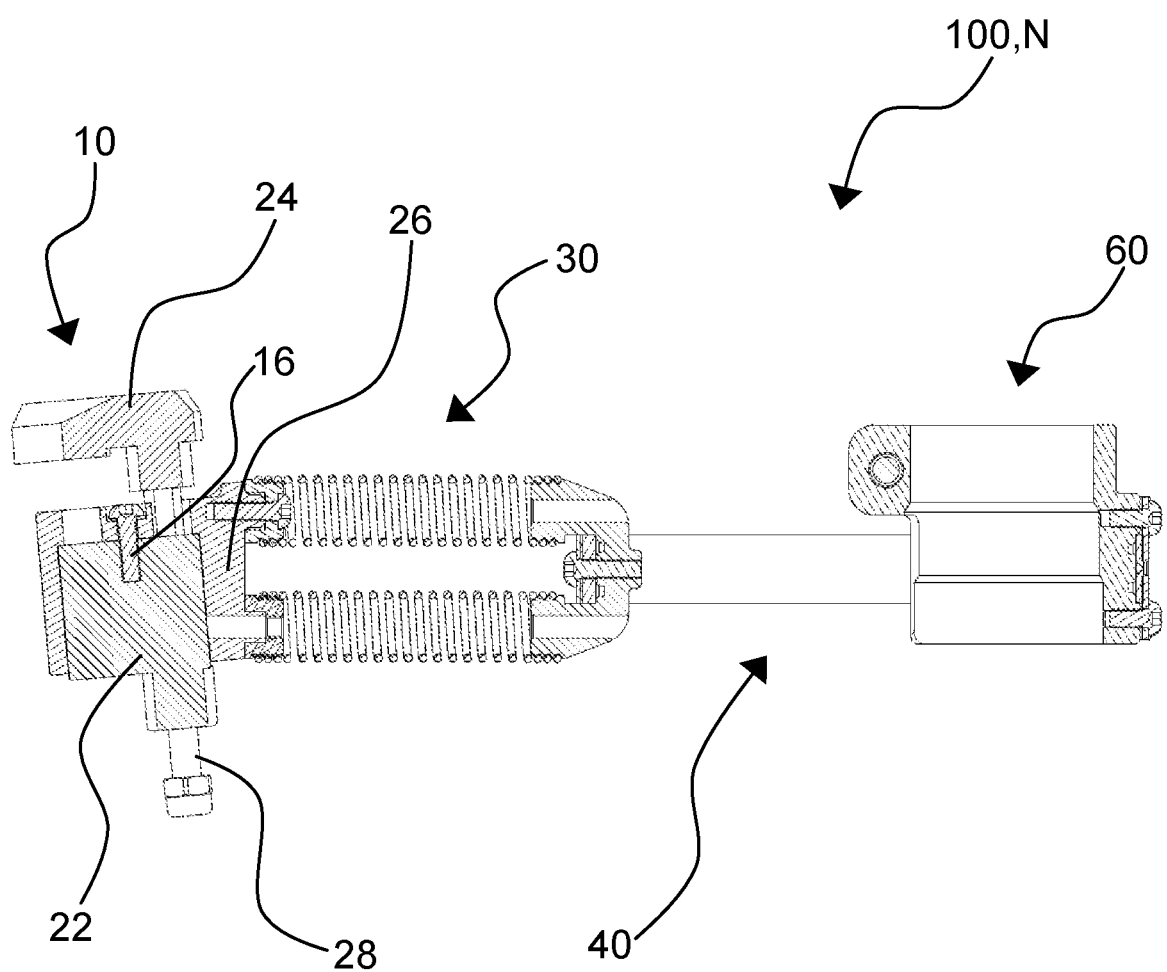
FIG. 4 is a sectional view of the apparatus of FIG. 2.
Figure 5:
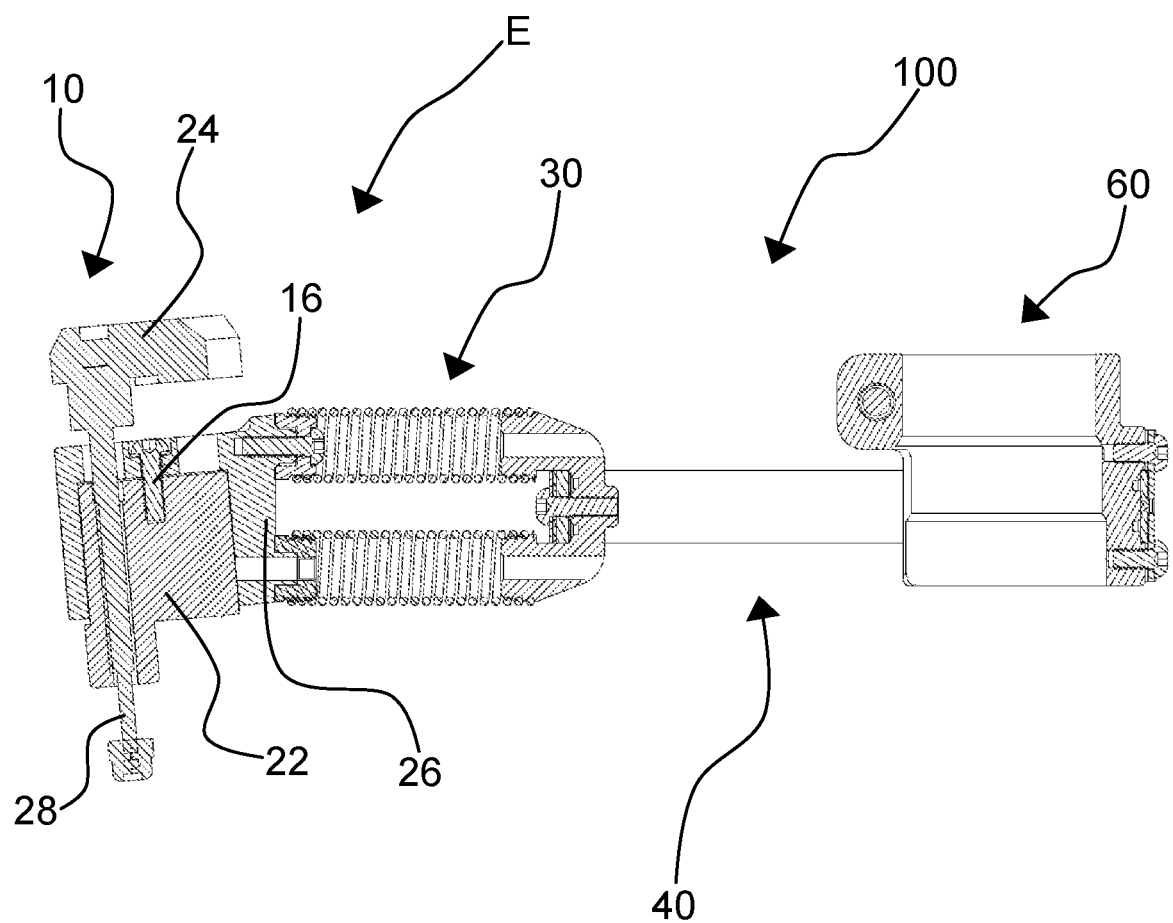
FIG. 5 is a drawing of the apparatus of FIG. 2 in a sectional view in an energetic state of the energy storing device for further explaining the invention.

FIGS. 4 and 5 show the apparatus 100 in a section along the straight line G. In FIG. 4, the receptacle 26 of the mounting device 10 is in a position displaced by a rotational position of the excentre 22 in the opposite direction to the coupling device 60, in which a pretension of the traction spring 33 of the energy storing device 30 is brought about. In FIG. 5, the receptacle 26 of the mounting device 10 is in a position displaced by a rotational position of the excentre 22 in the direction towards the coupling device 60, in which the traction springs 33 of the energy storing device 30 are relaxed compared to the pretensioned state shown in FIG. 4. The condition shown in FIG. 5 may be an assembled condition or a relaxed condition E in which the pretension of the traction springs 33 is reduced or removed compared to the pretensioned condition of the traction springs 33 shown in FIG. 4.

Figure 6:
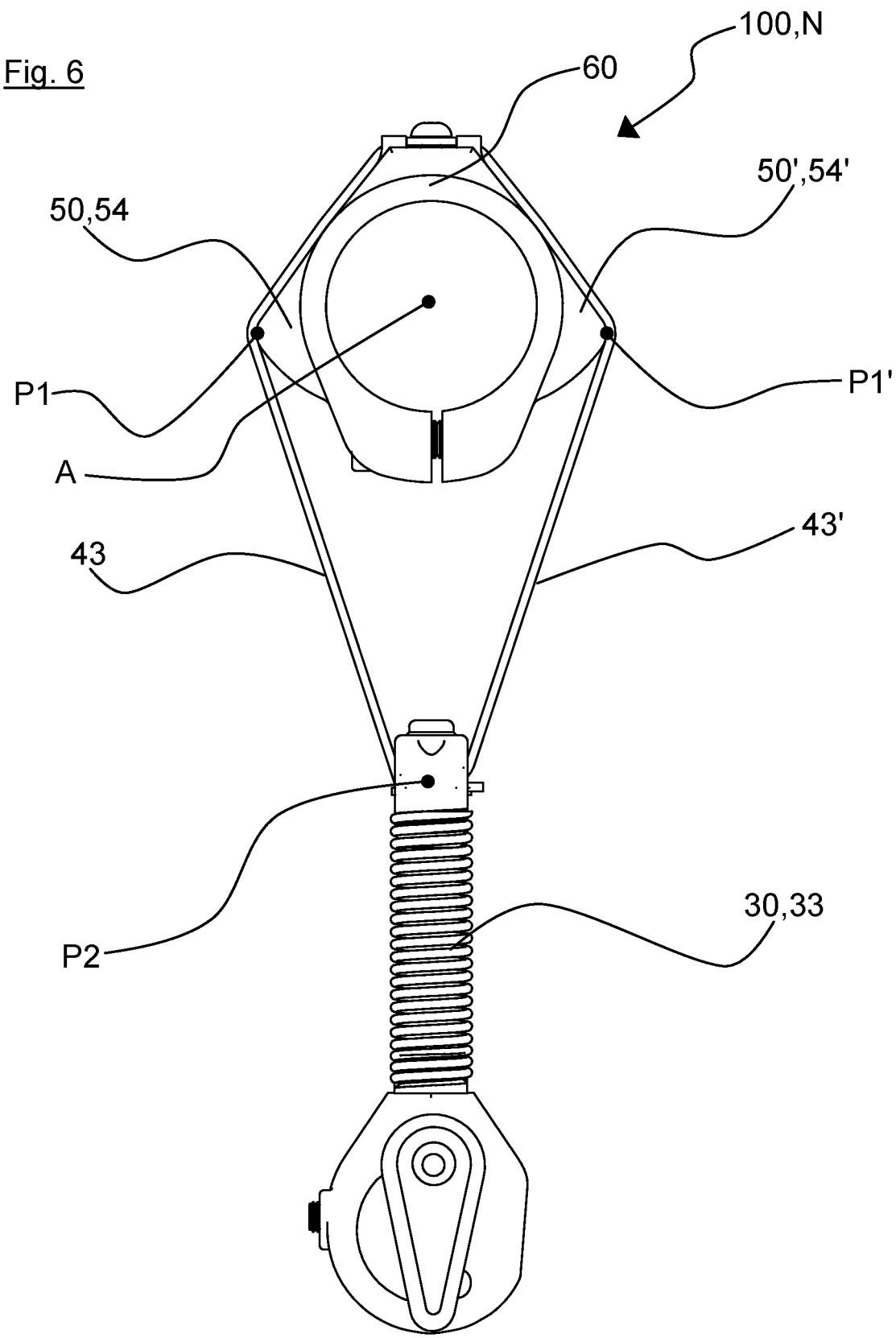
FIG. 6 is a drawing of the apparatus of FIG. 2 in a top view.

FIG. 6 shows the apparatus 100 in a top view and in a pretensioned state of the traction springs 33 of the energy storing device 30 as shown in FIG. 4. The apparatus 100 is in the neutral position N, in which the traction elements 43, 43', starting from the force transmitting points P1, P1' up to a common application point P2 on the traction springs 33, are of equal length and are under equal tensile stress. The force transmitting points P1, P1' are symmetrically formed on the cams 54, 54' or on the force transmission elements 50, 50'. The force transmitting points P1, P1' are formed at the respective largest radii of the cams 54, 54'.

Figure 7:
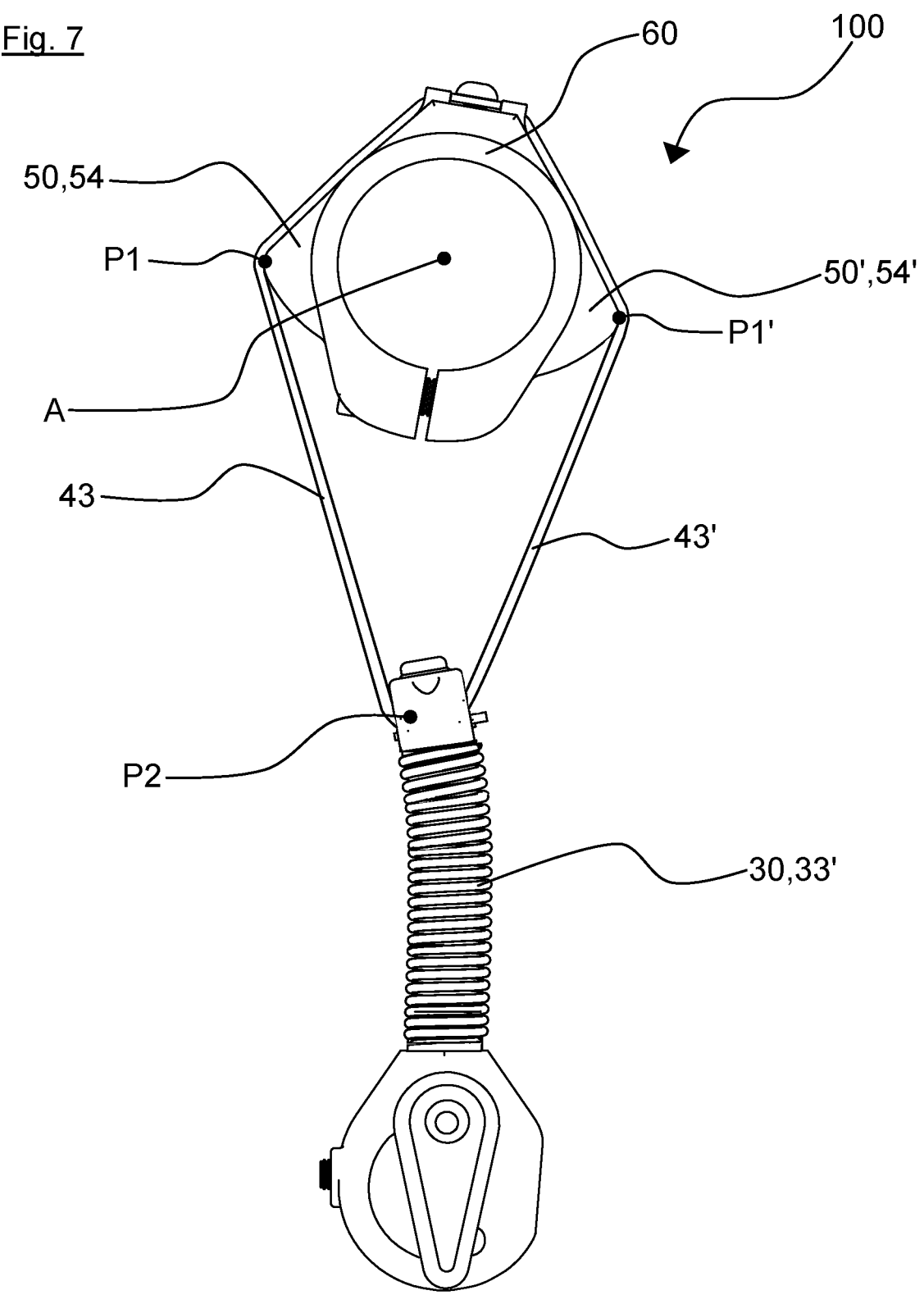
FIG. 7 is a drawing of the apparatus of FIG. 2 in a top view in a first steering state of the coupling device for further explaining the invention.

FIG. 7 shows the apparatus 100 in top view and in a changed state compared to the state shown in FIG. 6. In the state shown in FIG. 7, the coupling device 60 is rotated to the right by a setting of a steering to the right. In this state, the two traction elements 43, 43' are still tensile-stressed and the traction spring 33 is bending-stressed compared to the state shown in FIG. 6. Between the states shown in FIG. 6 and FIG. 7, a restoring moment may build up progressively. The restoring moment may build up progressively directly from the neutral position N in FIG. 6.

Figure 8:
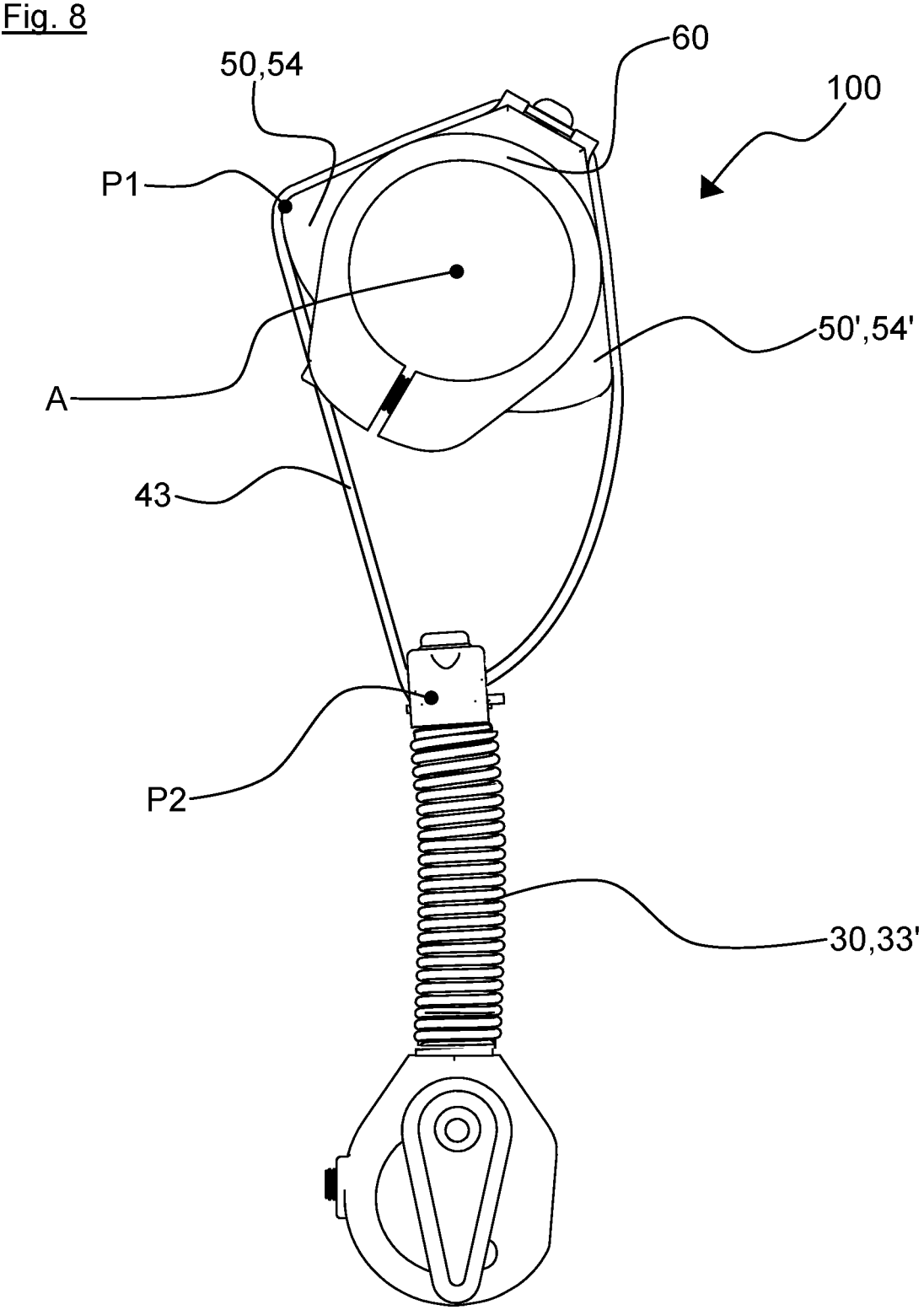
FIG. 8 is a drawing of the apparatus of FIG. 2 in a top view in a second steering state of the coupling device for further explaining the invention.

FIG. 8 shows the apparatus 100 in top view and in a further modified state compared to the state shown in FIG. 7. In the state shown in FIG. 8, the coupling device 60 is further rotated to the right by a greater steering to the right. In this state, only one traction element 43 of the traction elements 43, 43' is still tensile-stressed. If the traction element that is not under tension is a strap, it may be relaxed. The traction spring 33 is more tensile-stressed than in the state shown in FIG. 6.

Figure 9:
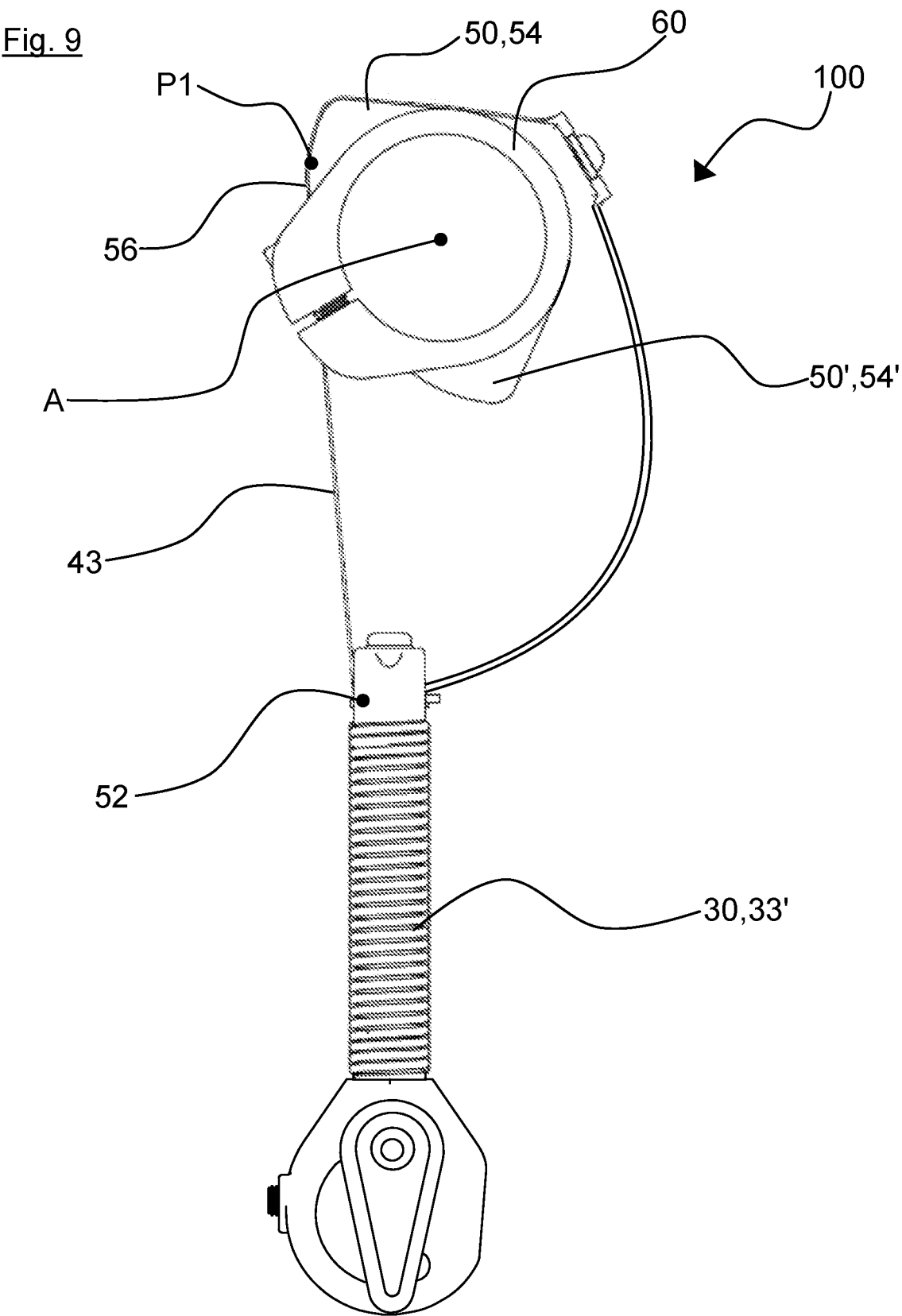
FIG. 9 is a drawing of the apparatus of FIG. 2 in a top view in a third steering state of the coupling device for further explaining the invention.

FIG. 9 shows the apparatus 100 in top view and in a further modified state compared to the state shown in FIG. 8. In the state shown in FIG. 9, the coupling device 60 is further rotated to the right by an even greater steering to the right compared to the state shown in FIG. 8. In this state, the force transmitting point P1 on the force transmission element 50 or on the cam surface 56 is shifted so that the force transmitting point P1 is formed at a smaller radius of the cam 54. The force transmission may therefore change in such a way that the buildup of the restoring moment assumes a degressive course. The traction spring 33 is more tensile-stressed than in the state shown in FIG. 8.

Figure 10:
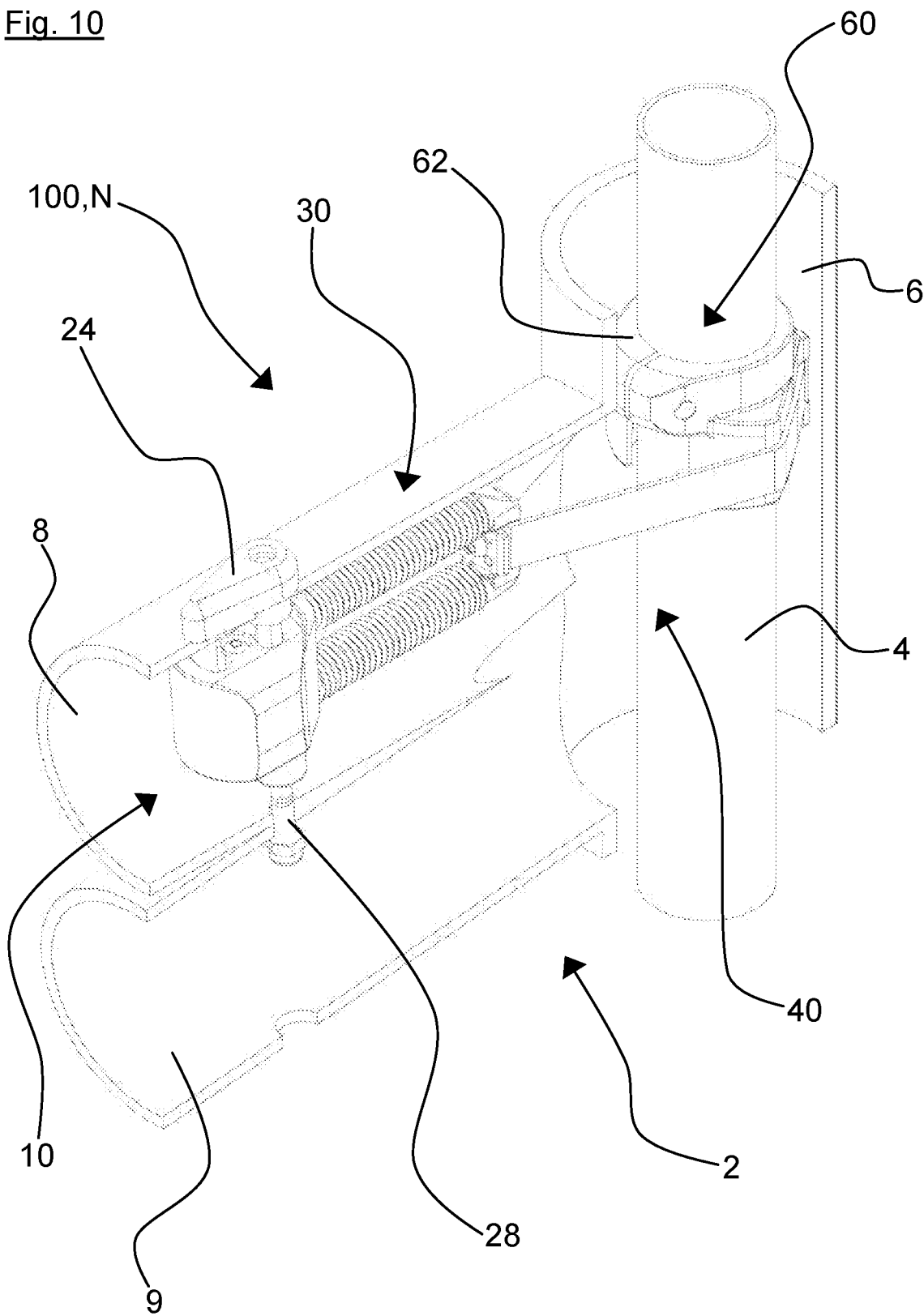
FIG. 10 is a drawing of the apparatus of FIG. 2 in an assembly state on a two-wheeler frame and on a handlebar stem.

FIG. 10 shows the apparatus 100 in an assembled state. The coupling device 60 is fastened to the fork shaft 4 via the clamping ring 62. The coupling device 60 is arranged integrated in a steering tube 6 of the two-wheeler frame 2. The mounting device 10 is mounted on a top tube 8 of the frame 2 via the mounting pin 28. In the embodiment shown, the mounting pin 28 is additionally mounted on a bottom tube 9 of the two-wheeler frame 2. The apparatus 100 is mounted in a state integrated into the two-wheeler frame 2. The force transmitting device 40 is integrated into the two-wheeler frame 2, and the force transmitting device 40 may be integrally arranged in the steering tube 6 and the top tube 8. The actuation lever 24 may protrude from the two-wheeler frame 2 as the only component of the apparatus 100 to transmit energy to the energy storing device 30 in the neutral position N.

Figure 11:
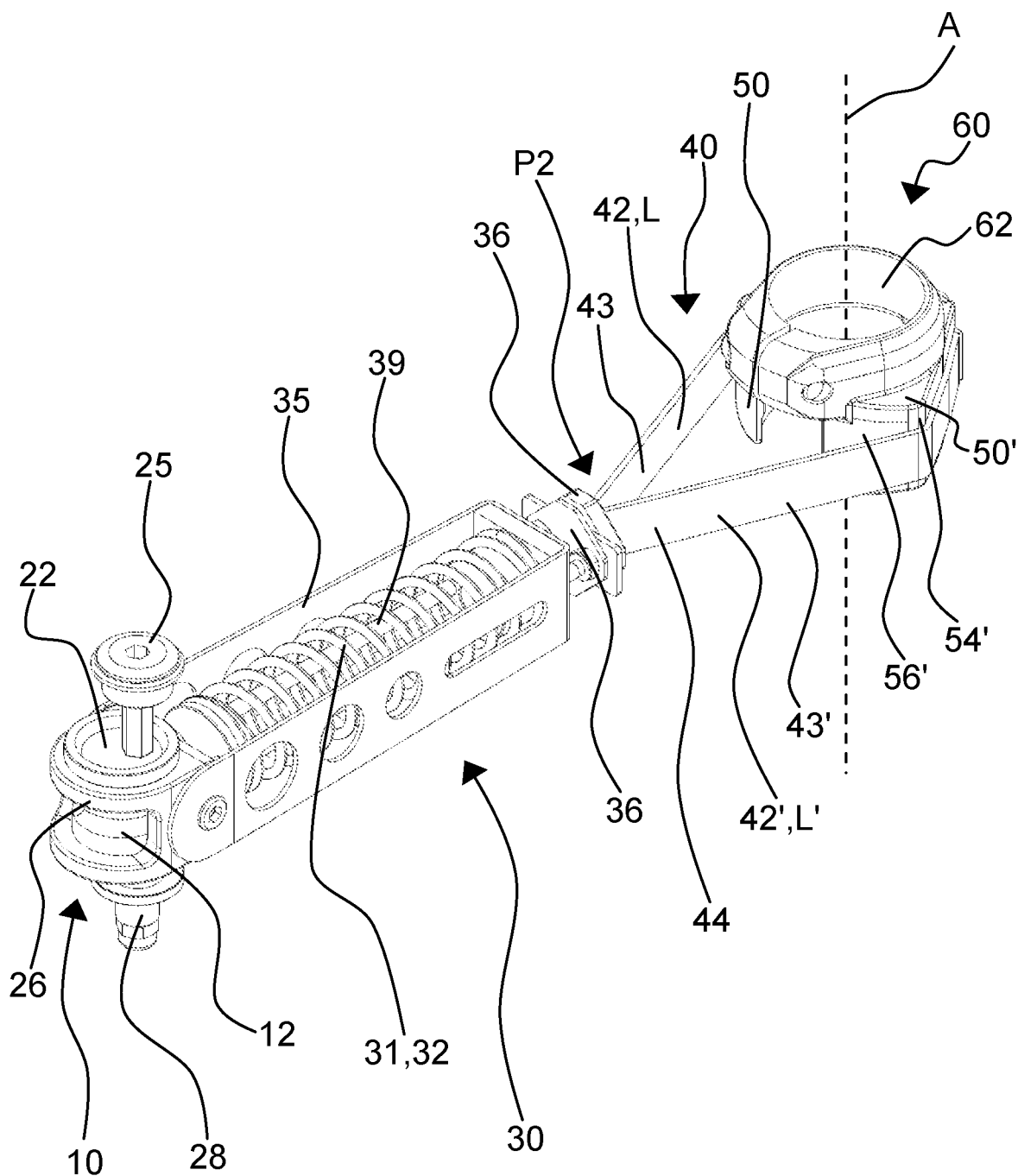
FIG. 11 is a drawing of an apparatus for providing a restoring moment in a perspective view according to a further embodiment of the invention.
Figure 12:
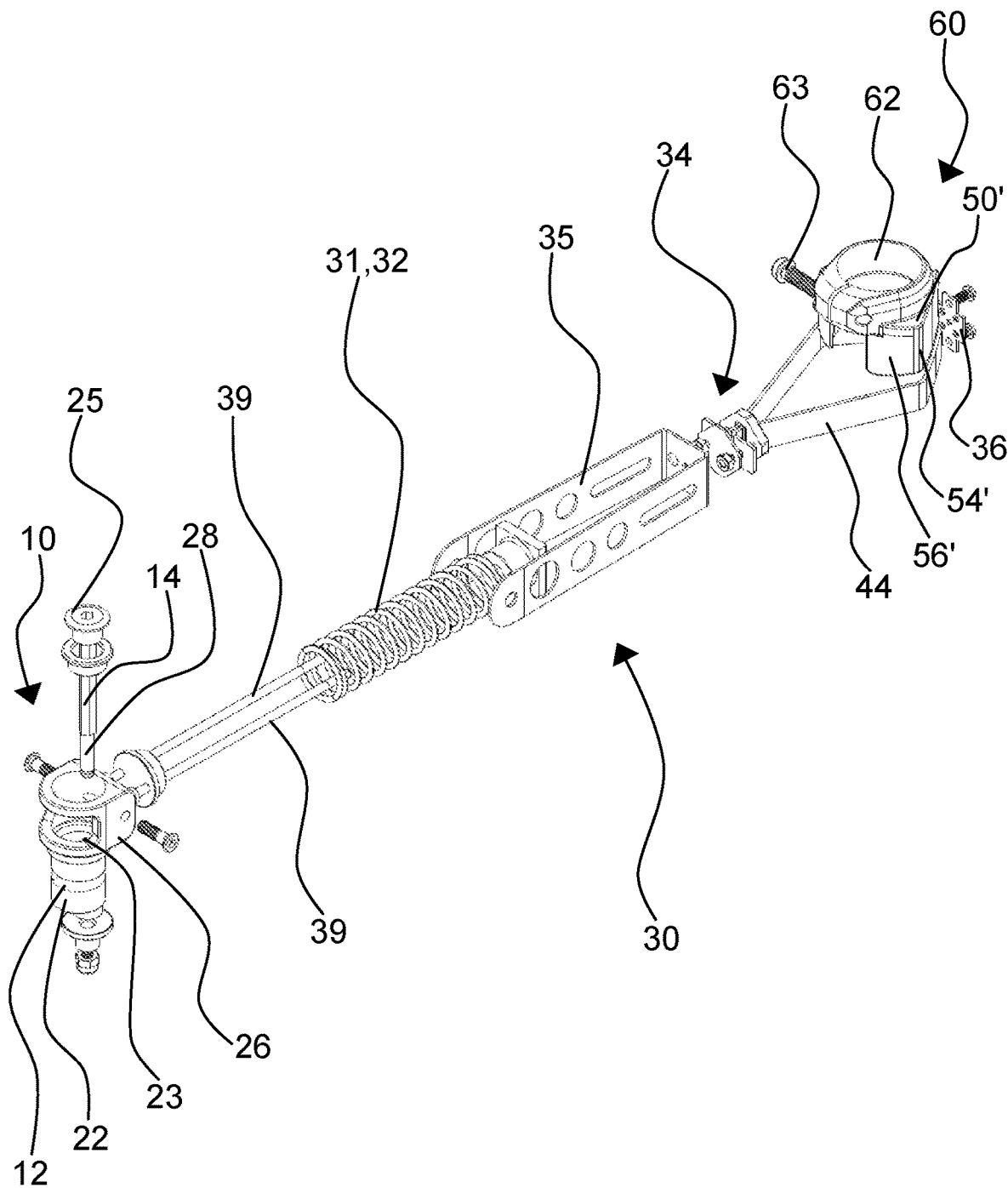
FIG. 12 is a drawing of the apparatus of FIG. 11 in an exploded view.

FIGS. 11 and 12 show the apparatus 100 in a further embodiment. FIG. 11 shows the apparatus 100 in the neutral position N in a perspective view. FIG. 12 shows the apparatus 100 in an exploded view.

The embodiment of the apparatus 100 shown in FIGS. 11 and 12 differs from the embodiment of the apparatus 100 shown in FIGS. 2 through 10 in the design of the force transmitting device 40, the design of the energy storing device 30, and the design of the mounting device 10.

In contrast to the embodiment of the force transmitting device 40 shown in FIGS. 2 to 10, the force transmitting device 40 of the embodiment shown in FIGS. 11 and 12 has traction elements 43, 43' which act on the energy storing device 30 at an application point P2, wherein the traction strap 44 may be spread out as a triangle between the energy storing device 30 and the force transmitting elements 42, 42'.

In contrast to the embodiment of the energy storing device 30 shown in FIGS. 2 to 10, the energy storing device 30 of the embodiment shown in FIGS. 11 and 12 has a compression spring 32 formed as a coil spring. The compression spring 32 may be subjected to compression via compression rods 39 when steering to the left or right. The compression rods 39 are connected to the traction strap 44, so that a tensile stress on the traction strap 44 may cause a tensile stress on the compression rods 39 and thus a compression of the compression spring 32. The compression spring 32 may be disposed in a spring cage 35, which may be connected to the mounting device 10. The compression rods 39 may be guided on the spring cage 35.

In contrast to the embodiment of the energy storing device 30 shown in FIGS. 2 to 10, the mounting device 10 of the embodiment shown in FIGS. 11 and 12 has an actuation element 25 that may be actuated by a tool, such as a hexagon. The excentre 22 comprises the guide 12, which may comprise a stop body for limiting a rotation of the excentre 22.

REFERENCE SIGNS 2 two-wheeler frame
4 fork shaft
6 steering tube
8 top tube
9 bottom tube
10 mounting device
10' mounting element
12 guide groove
14 engagement area
16 centering
20 actuation mechanism
22 excentre
23 excentre engagement
24 actuation lever
25 actuation element
26 receptacle
28 mounting pin
30 energy storing device
30' energy storing element
31 spring
32 compression spring
33 traction spring
34 holder
35 spring cage
36 fastener plate
38 thread
39 compression rod
40 force transmitting device
42, 42' force transmitting element
43, 43' traction element
44 traction strap
46 strap overlap region
50, 50' force transmission element
54, 54' cam
56, 56' cam surface
60 coupling device
62 clamping ring
63 clamping screw
100 apparatus
E relaxed condition
G, G' straight line
L, L' force action line N neutral position
P1, P1' force transmitting point
P2, P2' application point
W, W' angle

The invention claimed is:

1. An apparatus for providing a restoring moment for a two-wheeler steering mechanism, with
   a mounting device for mounting the apparatus on a two-wheeler frame,
   a coupling device for coupling the apparatus with a fork shaft, the coupling device having a rotational axis,
   an energy storing device for storing a restoring force and
   a force transmitting device for transmitting a steering force to the energy storing device, the force transmitting device having a force transmitting point being eccentric to the rotational axis,
   the force transmitting device forming a force action line through the eccentric force transmitting point and an application point of the force transmitting device on the energy storing device for transmitting the steering force to the energy storing device, and wherein in a neutral position of the apparatus the force action line and a straight line running through the rotational axis and the application point enclose an angle.

2. The apparatus of claim 1, wherein the force transmitting device has two force transmitting elements for transmitting the steering force to the energy storing device, wherein each force transmitting element has a force transmitting point being eccentric to the rotational axis, wherein a force action line is formed through an eccentric force transmitting point and the application point for transmitting the steering force to the energy storing device when steering to the right, and wherein a further force action line is formed through the further eccentric force transmitting point and the application point for transmitting the steering force to the energy storing device when steering to the left.

3. The apparatus of claim 1, wherein the apparatus is configured to transmit energy to the energy storing device in the neutral position by which a stabilizing force for stabilizing the fork shaft is transmittable in the neutral position via the force transmitting device to the coupling device.

4. The apparatus of claim 1, with a compensating mechanism being configured to compensate a traction force acting on the force transmitting device when a steering angle sets from the neutral position in a predetermined steering angle range.

5. The apparatus of claim 1, wherein the force transmitting device is configured to provide a progressive buildup of the restoring moment when a steering angle sets from the neutral position in a predetermined steering angle range.

6. The apparatus of claim 1, wherein the force transmitting device is configured to provide a degressive buildup of the restoring moment when a steering angle sets in a predetermined steering angle range.

7. The apparatus of claim 5, wherein the steering angle that sets from the neutral position in the predetermined steering angle range for providing the progressive buildup of the restoring moment is smaller than the steering angle that sets in the predetermined steering angle range for providing the degressive buildup of the restoring moment.

8. The apparatus of claim 1, wherein the energy storing device elastically couples the mounting device and the coupling device.

9. The apparatus of claim 1, wherein the energy storing device has two energy storing elements for storing a restoring force, wherein one of the two energy storing elements is designed for storing a restoring force when steering to the right and the other one of the two energy storing elements is designed for storing a restoring force when steering to the left.

10. The apparatus of claim 1, wherein the energy storing device has at least one spring for storing a tension energy.

11. The apparatus of claim 10, wherein the spring is formed as a traction spring.

12. The apparatus of claim 10, wherein the apparatus is configured to apply a pretension to the spring in the neutral position by which a stabilizing force for stabilizing the fork shaft is transmittable in the neutral position via the force transmitting device to the coupling device.

13. The apparatus of claim 10, wherein the spring is configured such that it is bending stressed when a steering angle sets from the neutral position in a predetermined steering angle range.

14. The apparatus of claim 1, wherein the force transmitting device has a traction mechanism linking the coupling device and the energy storing device for transmitting a traction force that is based on the steering force to the energy storing device.

15. The apparatus of claim 14, wherein the traction mechanism has two traction elements for transmitting the steering force to the energy storing device, wherein a force action line is formed by a traction element for transmitting the steering force to the energy storing device when steering to the right, and wherein a further force action line is formed by the further traction element for transmitting the steering force to the energy storing device when steering to the left.

16. The apparatus of claim 15, wherein the traction mechanism is configured such that both traction elements are tensile stressed when a steering angle sets from the neutral position in a predetermined steering angle range.

17. The apparatus of claim 15, wherein the traction elements are arranged spaced apart from each other at the energy storing device.

18. The apparatus of claim 14, wherein the traction mechanism links the coupling device and the energy storing device via a trapezoid connection, wherein the shorter base line of the trapezoid connection is arranged at the energy storing device and the longer baseline of the trapezoid connection is arranged at the coupling device.

19. The apparatus of claim 18, wherein the legs of the trapezoid connection are formed by traction elements for transmitting the steering force to the energy storing device.

20. The apparatus of claim 15, wherein at least one of the traction elements is formed by a strap being connected with the coupling device.

21. The apparatus of claim 20, wherein the strap is formed as a limp strap.

22. The apparatus of claim 20, wherein the strap has a plastic-made strap, made of aramid fibers.

23. The apparatus of claim 1, wherein the force transmitting device has a force transmission element arranged on the coupling device, wherein the force transmitting point is arranged on the force transmission element.

24. The apparatus of claim 23, wherein the force transmission element is configured to variably set a force transmission for transmitting the steering force to the energy storing device when a steering angle sets in a predetermined steering angle range.

25. The apparatus of claim 23, wherein the force transmission element is configured to provide a force transmission for a degressive buildup of the restoring moment when a steering angle sets in a predetermined steering angle range.

26. The apparatus of claim 23, wherein the force transmission element is a cam.

27. The apparatus of claim 23, wherein the coupling device is formed integrally with the force transmission element.

28. The apparatus of claim 1, wherein the mounting device has an actuation mechanism for transmitting energy in the neutral position to the energy storing device.

29. The apparatus of claim 10, wherein the actuation mechanism is configured to transmit tension energy to the spring in the neutral position.

30. The apparatus of claim 28, wherein the actuation mechanism has a rotationally actuatable excentre which is operatively connected to the energy storing device for transforming a rotational movement of the excentre into energy being transmittable to the energy storing device.

31. The apparatus of claim 30, wherein the actuation mechanism has an actuation element rotationally fixed to the excentre, wherein the actuating element is an actuation lever, by which the rotational movement of the excentre can be induced tool-free.

32. The apparatus of claim 30, wherein the mounting device has a guide, the guide being a curved guide groove, for guiding a rotational movement of the excentre.

33. The apparatus of claim 30, wherein the mounting device has at least one stop body for setting a predefined rotational position of the excentre in which the actuation mechanism causes in the neutral position a predefined energy level being stored in the energy storing device.

34. The apparatus of claim 32, wherein the guide has the stop body.

35. A bicycle frame, on which the apparatus of claim 1 is mounted linkable with a fork shaft.

36. The two-wheeler frame of claim 35, wherein the apparatus is arranged into at least one frame component of the two-wheeler frame in an integrated manner.

37. A bicycle steering, with an apparatus according to claim 1 and a fork shaft with which the apparatus is coupled.

38. The bicycle steering of claim 37, wherein the apparatus is coupled with the fork shaft via a fork arm of a two-wheeler fork.

39. A bicycle, having the bicycle frame according to claim 35.

40. An apparatus for providing a restoring moment for a two-wheeler steering mechanism, comprising:
an energy storing device for storing a restoring force;
an actuation mechanism for transforming a rotational movement into energy being transmittable to the energy storing device;
a mounting element with which the actuating mechanism is mounted on a two-wheeler frame; and
an actuation element, wherein the actuation element is a lever, which is rotationally fixed to the actuating mechanism and with which the rotational movement is induced tool-free;
a coupling device for coupling the apparatus with a fork shaft, the coupling device having a rotational axis; and
a force transmitting device for transmitting a steering force to the energy storing device, the force transmitting device having a force transmitting point being eccentric to the rotational axis;
the force transmitting device forming a force action line through the eccentric force transmitting point and an application point of the force transmitting device on the energy storing device for transmitting the steering force to the energy storing device, and wherein in a neutral position of the apparatus the force action line and a straight line running through the rotational axis and the application point enclose an angle.

41. An apparatus for providing a restoring moment for a two-wheeler steering mechanism, with
a mounting device for mounting the apparatus on a two-wheeler frame,
a coupling device comprising a clamp or clip coupling the apparatus with a fork shaft in a rotationally fixed manner, the coupling device having a rotational axis,
an energy storing device for storing a restoring force and
a force transmitting device for transmitting a steering force to the energy storing device, the force transmitting device having a force transmitting point being eccentric to the rotational axis,
the force transmitting device forming a force action line through the eccentric force transmitting point and an application point of the force transmitting device on the energy storing device for transmitting the steering force to the energy storing device, and wherein in a neutral position of the apparatus the force action line and a straight line running through the rotational axis and the application point enclose an angle.

42. An apparatus for providing a restoring moment for a two-wheeler steering mechanism, with
a mounting device for mounting the apparatus on a two-wheeler frame,
a coupling device for coupling the apparatus with a fork shaft, the coupling device having a rotational axis,
an energy storing device for storing a restoring force, the energy storing device comprising a spring, and
a force transmitting device for transmitting a steering force to the energy storing device, the force transmitting device having a force transmitting point being eccentric to the rotational axis, the force transmitting device forming a force action line through the eccentric force transmitting point and an application point of the force transmitting device on the energy storing device for transmitting the steering force to the energy storing device, and wherein in a neutral position of the apparatus the force action line and a straight line running through the rotational axis and the application point enclose an angle.

* * * * *